United States Patent
Kumar

(10) Patent No.: US 11,087,222 B2
(45) Date of Patent: *Aug. 10, 2021

(54) PROVIDING INTELLIGENT STORAGE LOCATION SUGGESTIONS

(71) Applicant: DROPBOX, INC., San Francisco, CA (US)

(72) Inventor: Neeraj Kumar, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 15/814,642

(22) Filed: Nov. 16, 2017

(65) Prior Publication Data

US 2018/0129950 A1    May 10, 2018

Related U.S. Application Data

(63) Continuation of application No. 15/348,616, filed on Nov. 10, 2016, now Pat. No. 9,852,377.

(51) Int. Cl.
*G06N 5/04* (2006.01)
*G06N 20/00* (2019.01)
(Continued)

(52) U.S. Cl.
CPC ............. *G06N 5/04* (2013.01); *G06F 16/168* (2019.01); *G06F 16/22* (2019.01);
(Continued)

(58) Field of Classification Search
CPC ................. G06N 5/04; G06F 17/30011; G06F 17/30067; G06F 17/30103; G06F 17/3012;
(Continued)

(56) References Cited

U.S. PATENT DOCUMENTS

| | | | |
|---|---|---|---|
| 6,590,608 B2* | 7/2003 | Matsumoto | G11B 27/034 348/231.2 |
| 6,751,614 B1* | 6/2004 | Rao | G06F 16/355 |

(Continued)

FOREIGN PATENT DOCUMENTS

| | | |
|---|---|---|
| WO | WO 2009094661 A1 | 7/2009 |
| WO | WO 2009117607 A1 | 9/2009 |

OTHER PUBLICATIONS

ExcalTech, "5 Easy Ways to Move Several Files at Once in Windows", Jul. 21, 2016, p. 103 (URL: https://www.excaltech.com/5-easy-ways-move-files-windows/) (Year: 2016).*

(Continued)

*Primary Examiner* — Paulinho E Smith
(74) *Attorney, Agent, or Firm* — Keller Jolley Preece

(57) ABSTRACT

One or more embodiments of a content system provide machine-learned storage location recommendations for storing content items. Specifically, an online content management system can train a machine-learning model to identify a storage pattern from previously stored content items in a plurality of storage locations corresponding to a user account of a user. Training the machine-learning model includes training a plurality of classifiers for the plurality of storage locations. The online content management system uses the classifiers to determine whether a content item is similar to the content items in any of the storage locations, and based on the output of the classifiers, provides graphical elements indicating recommended storage locations within a graphical user interface. The user can select a graphical element to move the content item to the corresponding storage location.

20 Claims, 9 Drawing Sheets

(51) Int. Cl.
*G06F 16/22* (2019.01)
*G06F 16/25* (2019.01)
*G06F 16/28* (2019.01)
*G06F 16/2457* (2019.01)
*G06F 16/9032* (2019.01)
*G06F 16/16* (2019.01)

(52) U.S. Cl.
CPC ........ *G06F 16/24578* (2019.01); *G06F 16/25* (2019.01); *G06F 16/285* (2019.01); *G06F 16/90324* (2019.01); *G06N 20/00* (2019.01)

(58) Field of Classification Search
CPC ......... G06F 17/30126; G06F 17/30253; G06F 17/30598; G06F 17/30705; G06F 17/30707; G06F 17/30601; G06F 17/30713
See application file for complete search history.

(56) References Cited

U.S. PATENT DOCUMENTS

| | | | |
|---|---|---|---|
| 6,993,517 B2* | 1/2006 | Naito | G06F 16/33 |
| 7,028,250 B2* | 4/2006 | Ukrainczyk | G06F 17/218 |
| | | | 715/202 |
| 7,039,856 B2* | 5/2006 | Peairs | G06F 16/5846 |
| | | | 715/200 |
| 7,043,492 B1* | 5/2006 | Neal | G06F 16/353 |
| 7,076,527 B2* | 7/2006 | Bellegarda | G06Q 10/107 |
| | | | 379/93.24 |
| 7,440,944 B2* | 10/2008 | Selvaraj | G06K 9/6269 |
| 7,533,093 B2* | 5/2009 | Gutta | G06Q 30/02 |
| 7,739,304 B2* | 6/2010 | Naaman | G06K 9/00677 |
| | | | 707/784 |
| 7,849,141 B1* | 12/2010 | Bellegarda | G06Q 10/107 |
| | | | 707/665 |
| 7,949,660 B2* | 5/2011 | Green | G06F 16/48 |
| | | | 707/737 |
| 8,108,204 B2* | 1/2012 | Gabrilovich | G06F 16/313 |
| | | | 704/9 |
| 8,572,084 B2* | 10/2013 | Knight | G06N 5/02 |
| | | | 707/737 |
| 8,635,223 B2* | 1/2014 | Knight | G06N 5/02 |
| | | | 707/737 |
| 8,793,573 B2* | 7/2014 | Beckmann | G06F 16/958 |
| | | | 715/251 |
| 8,856,161 B2* | 10/2014 | Balakrishnan | G06F 16/275 |
| | | | 707/758 |
| 8,886,576 B1 | 11/2014 | Sanketi et al. | |
| 8,990,688 B2 | 3/2015 | Lee et al. | |
| 9,008,438 B2* | 4/2015 | Kawanishi | H04N 5/91 |
| | | | 382/195 |
| 9,065,794 B2 | 6/2015 | Smith et al. | |
| 9,069,845 B2* | 6/2015 | Oliver | G06F 16/9535 |
| 9,152,723 B2* | 10/2015 | Lee | G06Q 10/107 |
| 9,235,752 B2 | 1/2016 | Eaton et al. | |
| 9,251,508 B2* | 2/2016 | Bishop | G06Q 10/107 |
| 9,380,086 B2* | 6/2016 | Baccichet | H04L 65/605 |
| 9,384,226 B1* | 7/2016 | Goel | G06F 16/9535 |
| 9,424,529 B2 | 8/2016 | Agrawal et al. | |
| 9,448,704 B1* | 9/2016 | Belhumeur | G06F 3/04842 |
| 9,471,581 B1 | 10/2016 | Lee | |
| 9,477,673 B2* | 10/2016 | Dwan | G06F 16/16 |
| 9,483,741 B2* | 11/2016 | Sun | G06F 16/353 |
| 9,501,762 B2* | 11/2016 | Babenko | G06Q 10/101 |
| 9,547,712 B2* | 1/2017 | Kraley | G06F 16/285 |
| 9,558,401 B2* | 1/2017 | Chajed | G06K 9/00456 |
| 9,852,377 B1 | 12/2017 | Kumar | |
| 2001/0042085 A1 | 11/2001 | Peairs et al. | |
| 2002/0022956 A1 | 2/2002 | Ukrainczyk et al. | |
| 2007/0027911 A1* | 2/2007 | Hakala | G06F 16/50 |
| 2009/0012991 A1 | 1/2009 | Johnson et al. | |
| 2009/0119324 A1 | 5/2009 | Simard et al. | |
| 2009/0163183 A1* | 6/2009 | O'Donoghue | G06Q 30/02 |
| | | | 455/414.1 |
| 2009/0265631 A1 | 10/2009 | Sigurbjornsson et al. | |
| 2009/0327168 A1 | 12/2009 | Weinberger et al. | |
| 2010/0274750 A1 | 10/2010 | Oltean et al. | |
| 2011/0125783 A1 | 5/2011 | Whale et al. | |
| 2011/0243461 A1* | 10/2011 | Nayar | G06K 9/00281 |
| | | | 382/224 |
| 2011/0264528 A1 | 10/2011 | Whale | |
| 2014/0181157 A1* | 6/2014 | Houston | G06F 16/22 |
| | | | 707/812 |
| 2014/0201180 A1 | 7/2014 | Fatourechi et al. | |
| 2014/0280188 A1 | 9/2014 | Seiwald et al. | |
| 2014/0330836 A1* | 11/2014 | Parashar | G06F 16/901 |
| | | | 707/741 |
| 2016/0026720 A1 | 1/2016 | Lehrer et al. | |
| 2016/0092730 A1 | 3/2016 | Smirnov | |
| 2016/0239900 A1 | 8/2016 | Kamdar et al. | |
| 2016/0247080 A1 | 8/2016 | Trantham et al. | |
| 2018/0121825 A1 | 5/2018 | Kumar | |

OTHER PUBLICATIONS

Kishore, "How to Automatically Move or Copy Files in Windows", Oct. 11, 2014, pp. 1-6 (Year: 2014).*
U.S. Appl. No. 15/348,616, Feb. 10, 2017, Office Action.
U.S. Appl. No. 15/348,616, Aug. 11, 2017, Notice of Allowance.
U.S. Appl. No. 15/336,358, May 29, 2019, Office Action.
Advisory Action from U.S. Appl. No. 15/336,358, dated Mar. 10, 2020, 2 pages.
Non-Final Office Action from U.S. Appl. No. 15/336,358, dated May 8, 2020, 29 pages.
Office Action for U.S. Appl. No. 15/814,642 dated Aug. 22, 2019, 30 pages.
Final Office Action from U.S. Appl. No. 15/336,358, dated Dec. 30, 2019, 26 pages.
Final Office Action from U.S. Appl. No. 15/336,358, dated Dec. 7, 2020, 29 pages.

* cited by examiner

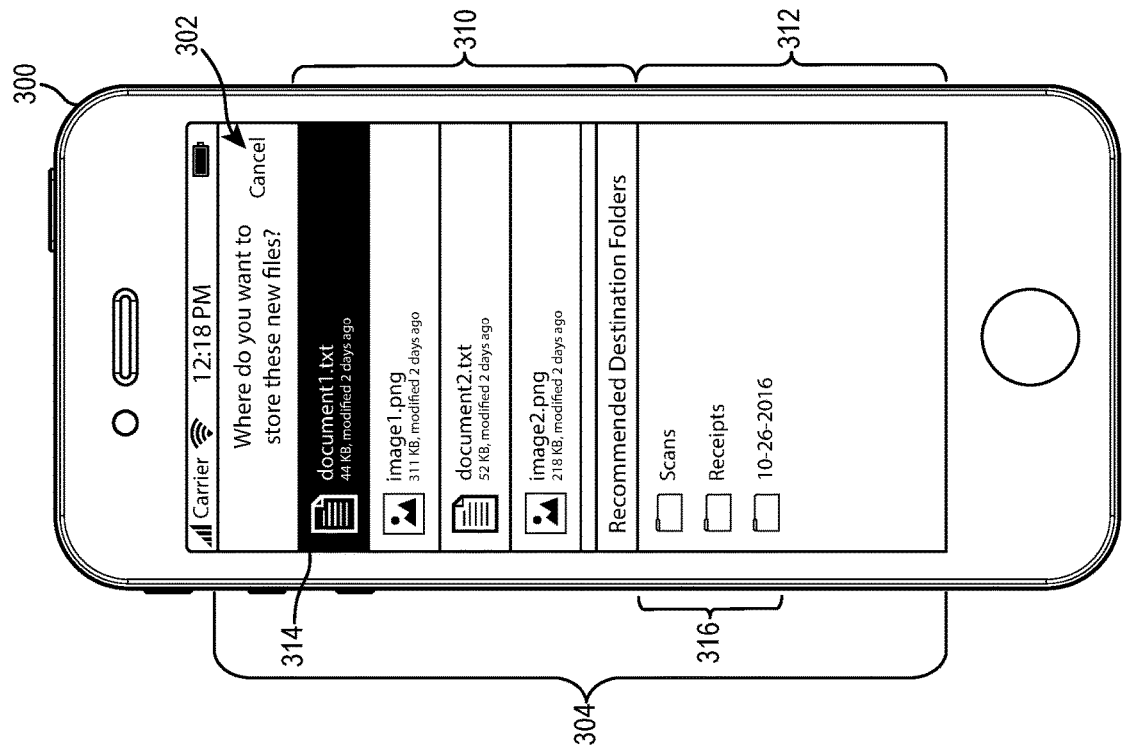
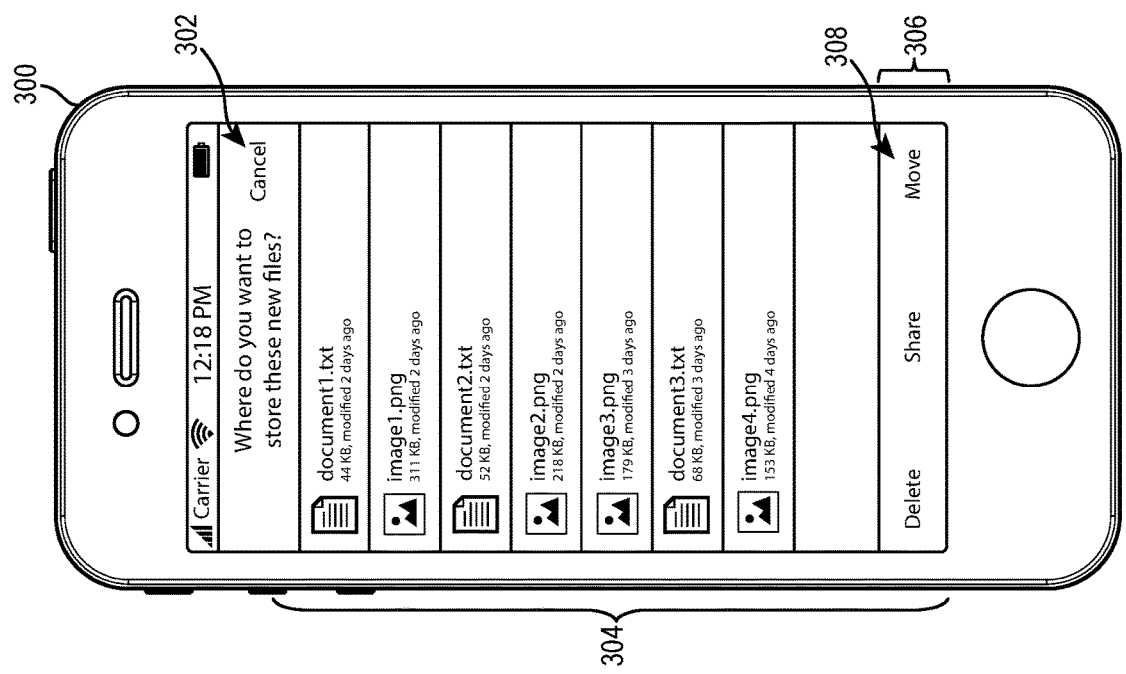
Fig. 3A
Fig. 3B

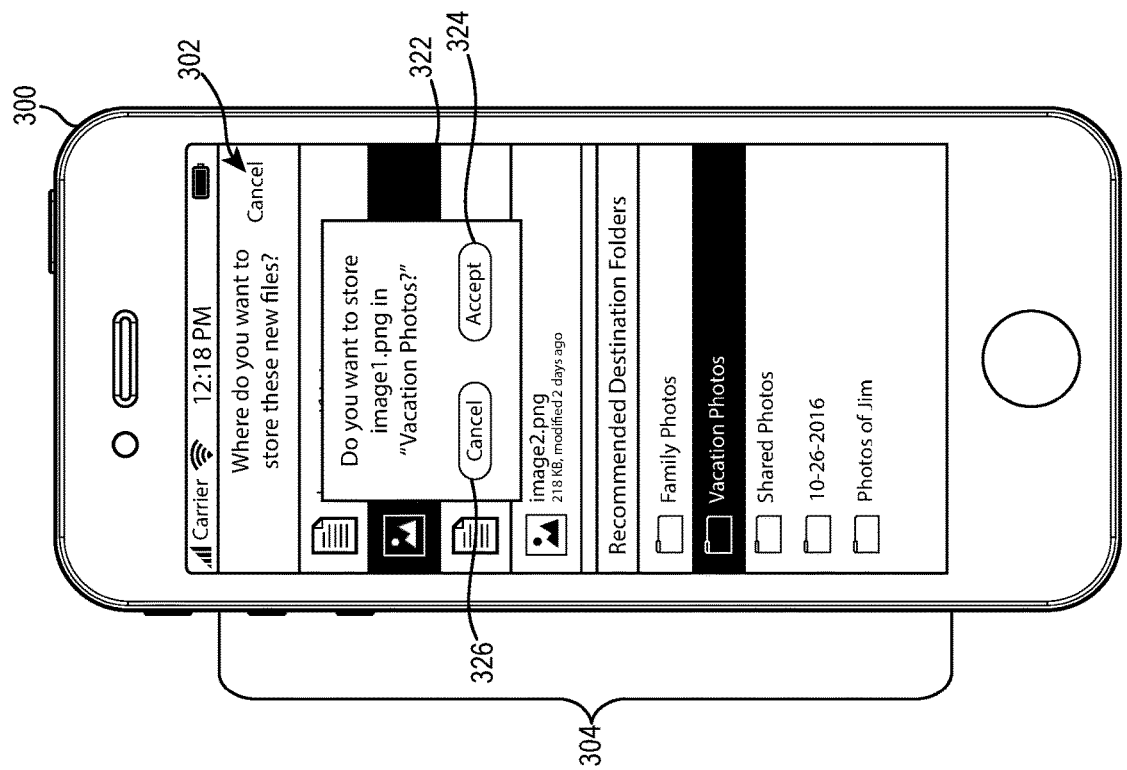
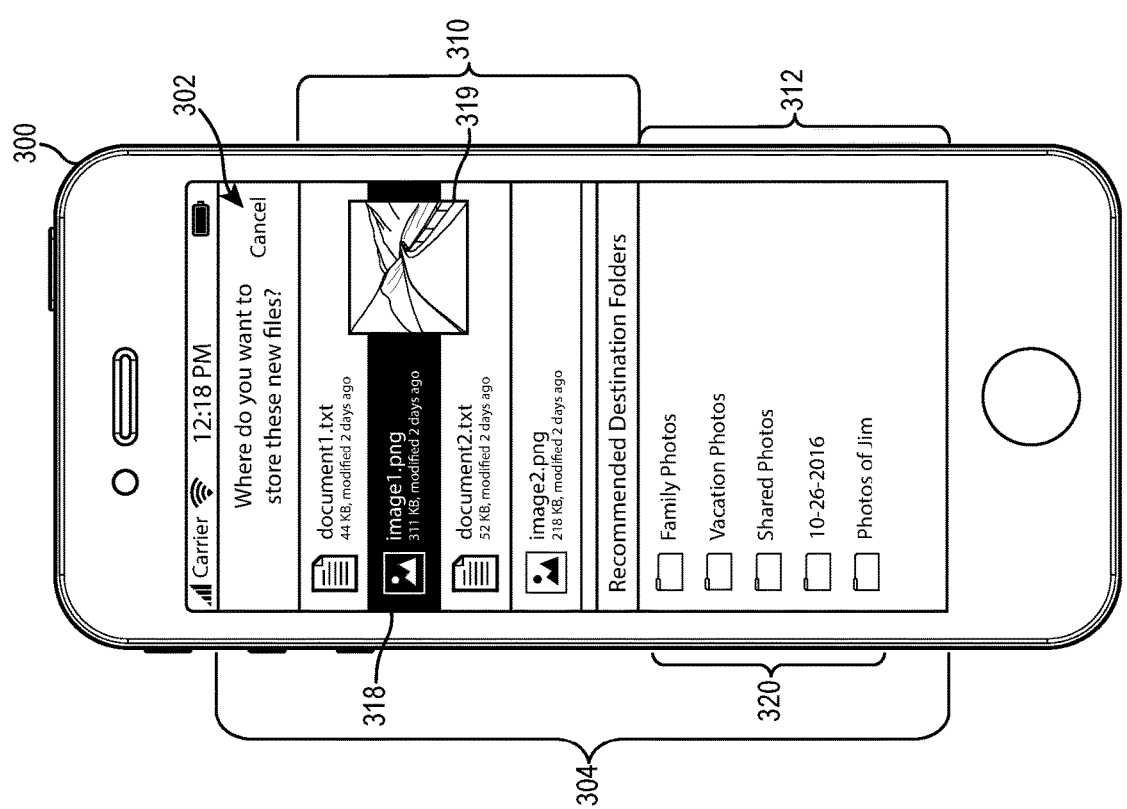
Fig. 3D
Fig. 3C

PROVIDING INTELLIGENT STORAGE LOCATION SUGGESTIONS

CROSS REFERENCE TO RELATED APPLICATIONS

The present application is a continuation of U.S. application Ser. No. 15/348,616, filed Nov. 10, 2016. The aforementioned application is hereby incorporated by reference in its entirety.

BACKGROUND

When storing digital content items on a client device or a remote storage device, determining where to store the content items (e.g., in which folder) can be an important part of organizing the content items. Specifically, organizing content items into different folders (or other storage locations) on a storage device can allow a user to more easily navigate the content items and find specific content items if the content items are well organized according to the user's preferences. For instance, users often store similar content items together in a single folder or related folders so that the user can know where to find the similar content items at a later time.

Content storage systems typically allow users to customize the number and names of folders within a hierarchy of folders. For example, such a system allows users to establish a file structure that includes one or more folders with as many parent/child nodes as the user desires. Some conventional content storage systems allow users to select a storage location at the time of storing a content item or when moving the content item to another storage location at a later time. Finding an appropriate storage location for a content item using conventional systems, however, is often a tedious experience.

Some conventional content storage systems provide an interface with a view of a file structure by which the user can navigate to a desired storage location. For example, the conventional systems often provide a view of the file structure from a root node (or root nodes) each time the user selects an option to store/move a content item. Thus, each time the user stores/moves a content item, the user must navigate through the hierarchy from the root node(s) to find a desired location for the content item. Navigating through the hierarchy every time can be cumbersome and frustrating, particularly when storing/moving content items to a location or locations that are nested deep within the file structure.

Some conventional content storage systems present the most recently used location in response to a request to store/move a content item. Presenting the user with the most recently used location allows the user to quickly store a content item if the content item belongs in the most recently used location. However, if the user attempts to store a content item that does not belong in the most recently used location, the user then has to navigate from the most recently used location to the appropriate location, which can involve navigating up and/or down one or more nodes. Thus, conventional systems that rely on most recently used locations are also limited in how much the conventional systems aid the users in finding appropriate locations for storing content. Accordingly, a number of disadvantages are present with regard to conventional systems for storing content items.

SUMMARY

One or more embodiments described herein provide benefits and/or solve one or more of the foregoing or other problems in the art with systems and methods for digital content storage management. In particular, the systems and methods described herein provide machine-learned storage location suggestions for storing content items. For example, the systems and methods train a machine-learning model to provide storage location suggestions for storing/moving content items. Specifically, the machine-learning model uses a plurality of classifiers based on previously stored content items associated with a user account of a user to determine where to store/move a content item. Thus, when the user selects an option to store a new content item or to move an existing content item (e.g., from a temporary storage location), the machine-learning model identifies one or more storage locations using the classifiers and provides the one or more storage locations as recommendations to the user.

The systems and methods train the classifiers for a plurality of storage locations associated with the user account of the user based on characteristics of content items stored in the plurality of locations. For example, the systems and methods use the characteristics of content items in a storage location to determine how the content items in the storage location are similar. Additionally, the systems and methods use the characteristics of the content items in other storage locations to distinguish the content items in the storage location from the content items in the other storage locations. The systems and methods then provide storage location recommendations for a content item by using the trained classifiers to determine which storage location(s) are best based on the characteristics of the content item.

Additional features and advantages of the present disclosure will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings.

FIGS. 3A-3D illustrate example graphical user interfaces for storing a digital content item in accordance with one or more embodiments;

DETAILED DESCRIPTION

Figure 1:
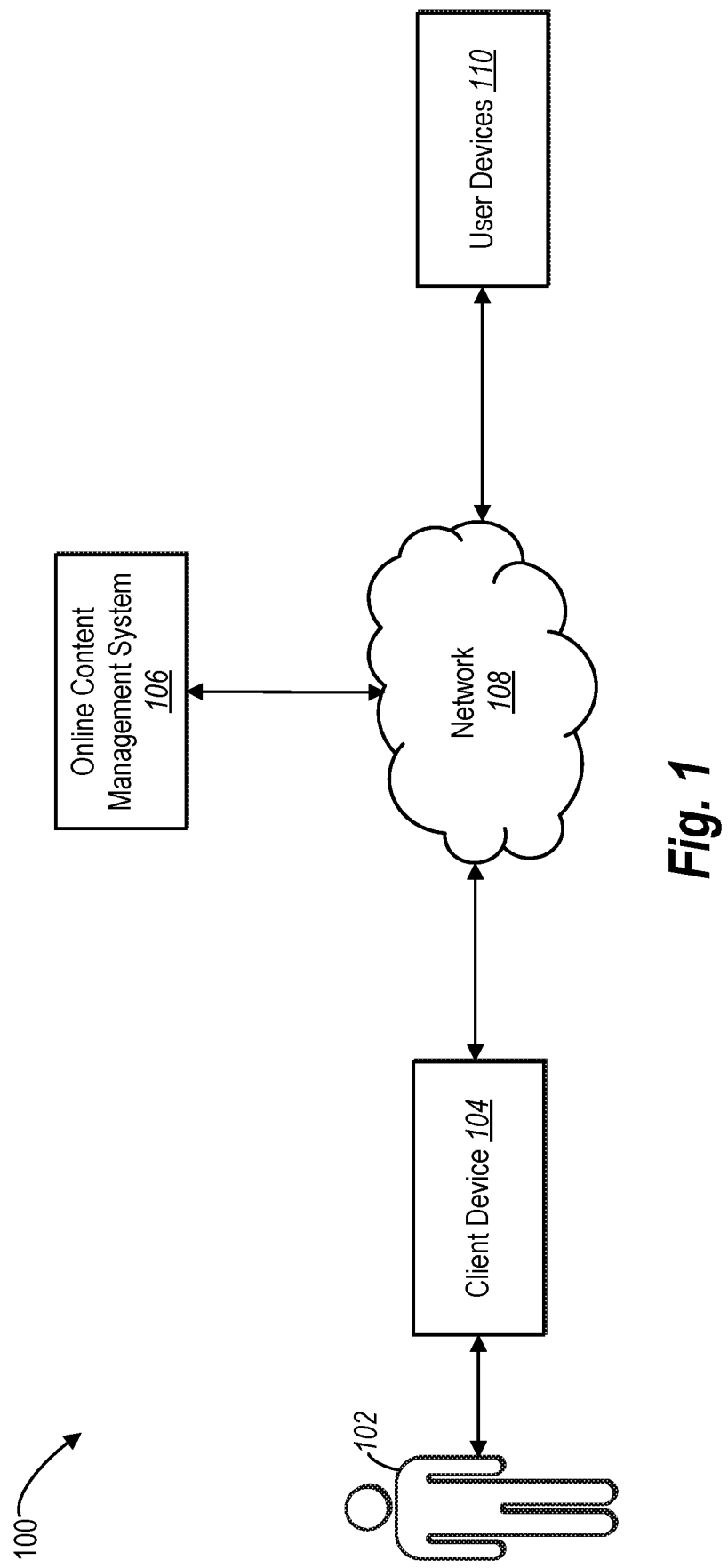
FIG. 1 illustrates a schematic diagram of an environment in which a content storage system operates in accordance with one or more embodiments.

Embodiments of the present disclosure provide a content storage system that provides storage location suggestions for digital content items. In particular, the content storage system provides storage location suggestions in response to determining that a user wants to store/move a content item. For example, when storing a content item (e.g., a text document, image file, video file) on a client device or on a remote storage device, the content storage system uses a machine-learning model to determine a recommendation to store the content item at one or more storage locations (e.g., folders). To illustrate, the content storage system trains a plurality of classifiers to identify one or more storage locations to which the content item most likely belongs based on the contents of the storage locations and/or previous actions by the user when storing content items. As such, the content storage system uses previously stored content items associated with the user account to determine where the user is likely to store a content item based on how similar the content item is to one or more of the previously stored content items.

As mentioned, the content storage system trains the plurality of classifiers using previously stored content items for the user account. Specifically, the content storage system trains a plurality of classifiers for the plurality of storage locations based on the content items in each storage location. For example, the content storage system can train a classifier for a storage location by analyzing the content items in the storage location to determine one or more characteristics that the content items have in common. Additionally, the content storage system can train a classifier for a storage location based on how the content items in the storage location differ from content items in other storage locations. To illustrate, the classifiers can include different weights for the characteristics of the content items in a storage location to indicate the relevant characteristics corresponding to the content items.

In one or more embodiments, the content storage system then uses the trained classifiers to determine which storage locations to recommend to a user when storing a content item. For example, when the user attempts to store a content item (either by creating a new content item or moving an existing content item), the content storage system applies the classifiers to the content item to identify one or more storage locations for the content item. Applying the classifiers to the content item allows the content storage system to identify the content items in the various storage locations that are most similar to the content item based on the characteristics of the content items.

The content storage system can also rank the recommended storage locations for a content item based on the classifiers. For instance, the content storage system can determine how similar the content item is to the content items in a plurality of different storage locations using the trained classifier. The content storage system can then rank the storage locations based on the determined similarity and provide recommendations that indicate the ranking. To illustrate, the content storage system can provide the recommended storage locations in an order based on the rankings associated with the storage locations.

Additionally, one or more embodiments of the content storage system provide a temporary storage location for initially storing content items. Specifically, the content storage system provides the temporary storage location to allow a user to store content items when first creating or uploading the content items. At a later time (e.g., next time the user logs into the content storage system), the content storage system can allow the user to move the content items from the temporary storage location to other storage locations. When the user selects a content item in the temporary storage location at a later time, the content storage system provides one or more recommended storage locations.

In one or more embodiments, the content storage system provides the recommended storage locations within a user interface of a client application. In particular, in response to a request to move a content item from the temporary storage location to a new storage location, the content storage system provides a plurality of recommended storage locations by way of the user interface. In at least some examples, the user interface includes a first view that includes the content item and a second view that includes the recommended storage locations. As the user selects different content items, the recommended storage locations in the second view change according to the selected content item. Thus, the content storage system dynamically provides, within a user interface, different recommendations for storage locations that correspond to the individual content items.

As mentioned, the content storage system described herein provides advantages over conventional content storage systems. The content storage system trains a machine-learning model based on a plurality of classifiers to identify storage locations in which a user is likely to store digital content items. Specifically, recommending storage locations to a user based on the user's content storage habits allows the user to easily store content items with other, similar content items. Thus, the content storage system increases the usability of a content organization structure by reducing or eliminating the need for a user to navigate through a hierarchy of storage locations every time the user attempts to store or move content items.

The content storage system also improves the user experience by providing a user-friendly, efficient system for moving digital content items from one storage location to another. For example, by providing a temporary storage location for initially storing content items, and then allowing a user to later move the content items to other storage locations, the content storage system provides the users with flexibility in determining how to store content items. Additionally, the content storage manager improves a user experience by reducing the number of user inputs from a user when storing content items, which is particularly useful in mobile environments.

FIG. 1 is a schematic diagram illustrating an environment for a digital content storage system (or simply "system" 100) to facilitate intelligent and efficient storing of content items. An overview of the environment is described in relation to FIG. 1. Thereafter, a more detailed description of the components and processes of system 100 and other components within the environment are provided in relation to the remaining figures. As used herein, the term "content item" refers to a digital file storable on a computing device. For example, a content item can include a text document, video file, audio file, digital image, or other media file that stores digital content. As used herein, the term "storage location" refers to a location where content items are store. For instance, a storage location can include a folder or other file structure element in which one or more content items are store. System 100 can aid the user in storing/moving files or folders from one location to another for creating a consistent and easily navigable file system.

As illustrated by FIG. 1, system 100 allows user 102 to use client device 104 to communicate with online content management system 106 via network 108. Specifically, client device 104 can communicate with online content management system 106 to store content items and/or to move content items in various storage locations. For example, user 102 can have a registered user account with the online content management system 106 for storing content items and making the content items available to user 102 through one or more client devices associated with the user account. As described herein, system 100 provides recommendations to a user to store content items in one or more storage locations.

As further illustrated in FIG. 1, and as described in more detail in additional figures, system 100 allows online content management system 106 to manage the user account for user 102. In particular, online content management system 106 can communicate with client device 104 to obtain information for the user account and maintain content items associated with the user account. Online content management system 106 uses information about the user account and the content items to provide recommended storage locations to client device 104 in response to requests by user 102 to store/move content items. The user account can be an account that the user establishes with online content management system 106 to store content items on a remote storage device (e.g., remote server devices). The user account can include identification information about the user, as well as information about the content items and storage locations.

Although FIG. 1 illustrates a particular arrangement of client device 104, online content management system 106, and network 108, various additional arrangements are possible. For example, client device 104 can communicate directly with online content management system 106, bypassing network 108. In another embodiment, system 100 implements one or more operations of online content management system 106 partially or entirely on client device 104. To illustrate, system 100 can analyze content stored in connection with the user account and provide storage location recommendations to user 102 when user 102 requests to store another content item. Thus, system 100 can implement some or all operations associated with providing storage location recommendations on a client device, a separate server device, and/or a plurality of devices including the client device and the server device.

As briefly mentioned previously, system 100 provides storage location recommendations when storing/moving content items. FIG. 1 illustrates that user 102 can use client device 104 to register a user account and store content items on online content management system 106. In particular, system 100 allows user 102 to use client device 104 to communicate with online content management system 106 via network 108 to store content items using an online storage system, such as a cloud-based storage system. System 100 can also allow other users to use other client devices to communicate with online content management system 106 via network 108 to register user accounts and store content items using the online storage system.

Online content management system 106 communicates with client device 104 to obtain naming information and user account information associated with user 102. For example, user 102 registers a user account with online content management system 106. The user account can provide user 102 with access to one or more services associated with online content management system 106, such as online content storage. In connection with the user account, user 102 can upload or otherwise transfer content items from client device 104 to online content management system 106 to store the content items and make the content items available to user 102 at one or more client devices.

In one or more embodiments, online content management system 106 collects and maintains content item data (e.g., storage location information, characteristics of content items) from client device 104 to train a machine-learning model. As used herein, the term "machine-learning model" can include one or more algorithms capable of learning how a user has interacted with previously stored content items (e.g., where the user has stored the content items) and outputs recommended storage locations for content items. In particular, online content management system 106 trains the machine-learning model using a plurality of content items and a file structure associated the user account of user 102. Online content management system 106 can then use the machine-learning model to provide storage location recommendations to user 102 when user 102 requests to move or otherwise store a content item.

Alternatively, online content management system 106 can use information from user accounts for a plurality of users associated with user devices 110 to provide storage location recommendations to any of the plurality of users. For example, the users can include a plurality of users that may be associated with each other in some way (e.g., friends, family, or co-workers) or may not be specifically associated with each other beyond having user accounts with online content management system 106. Additionally, user 102 may or may not be part of a group including the plurality of users. Online content management system 106 can also train different machine-learning models for different groups of users, such that online content management system 106 can use a first machine-learning model for a first user or group of users and a second machine-learning model for a second user or group of users.

According to one or more embodiments, client device 104 includes a computing device that allows user 102 to interact with content items. For example, client device 104 can include a desktop computing device or a handheld computing device. To illustrate, client device 104 allows user 102 to capture, create, modify, and/or store content items to one or more storage devices on client device 104 and/or on online content management system 106. Client device 104 also allows user 102 to move content items from one storage location to another storage location according to content item storage processes described herein.

In one or more embodiments, online content management system 106 includes one or more computing devices in communication with each other and with client device 104 via network 108. In particular, online content management system 106 can include one or more server devices that perform processes for storing content items and providing storage location recommendation services for users with user accounts. Thus, online content management system 106 can include or be part of a cloud-based storage system or other distributed storage environment. Alternatively, online content management system 106 can include a single computing device.

As discussed, the systems and components explained above with reference to FIG. 1 allow users to store content items and receive machine-learned storage location recommendations for the content items. FIG. 2 illustrates example process diagrams of one or more example embodiments of processes implemented by system 100 discussed above. Consistent with system 100 illustrated in FIG. 1, FIG. 2 illustrates (according to a sequence flow of operations) client device 104 and online content management system 106.

In one or more embodiments, a process for providing storage location recommendations for storing a content item begins with online content management system 106 training a machine-learning model. Specifically, online content management system 106 trains the machine-learning model to determine a storage pattern that indicates how and where a user stores content items. For example, the machine-learning model identifies storage conventions indicating how and where a user stores content items based on, but not limited to, the type of content, the application that the user used to generate the content, names of content items, and when the user created/stored the content. As a user stores content in a file structure, the machine-learning model learns how the user stores content, and can additionally learn the storage pattern if the pattern shifts over time.

Figure 2A:
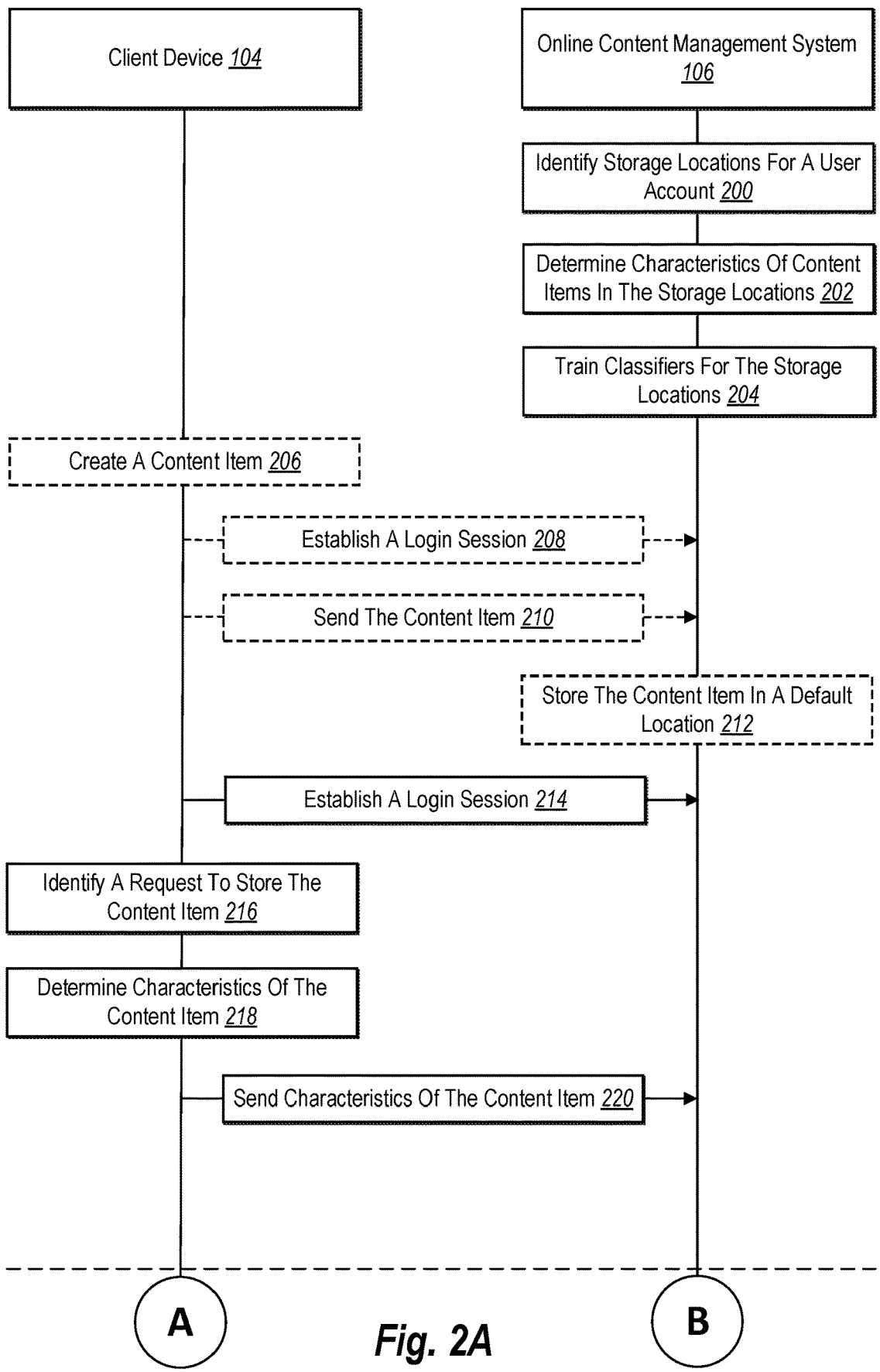
FIGS. 2A-2B illustrate a sequence-flow diagram illustrating interactions as part of a filename suggestion process in accordance with one or more embodiments.

As FIG. 2A illustrates, training the machine-learning model includes identifying storage locations for a user account 200. In particular, online content management system 106 can access a user account to obtain a file structure including a plurality of content items. For example, online content management system 106 can analyze the file structure to identify nodes (e.g., folders) within the file structure. The file structure can include any number of parent nodes and child nodes based on storage habits of a user. Online content management system 106 can identify each of the individual storage locations associated with the user's account and determine the hierarchy of the file structure.

In one or more embodiments, online content management system 106 identifies content items for a plurality of user accounts associated with a plurality of users. For example, online content management system 106 can access a plurality of user accounts for a plurality of related users (e.g., users who are employees of a single company). Alternatively, online content management system 106 can access all user accounts associated with the storage device. Thus, online content management system 106 can use content items from any number of user accounts to train the machine-learning model to provide generalized machine learning or specialized machine learning, as may serve a particular embodiment.

In one or more embodiments, online content management system 106 also determines characteristics of content items in the storage locations 202. For example, online content management system 106 can identify a type of each content item. Additionally, online content management system 106 can identify data in the content items including text data, image data, audio data, and/or video data. Data in the content items can allow online content management system 106 to further identify characteristics of the content items, such as, but not limited to; the subject matter of the content items (e.g., content type); location data for the content items; whether content items are associated with a particular project, event, or client; and/or metadata associated with the content items. The online content management system 106 then uses the identified characteristics and naming patterns to train the machine-learning model.

Based on the determined characteristics of the content items, online content management system 106 trains classifiers for the storage locations 204. Specifically, online content management system 106 can analyze the content items in a storage location to train a classifier (e.g., a random forest classifier) for the storage location by identifying one or more characteristics that the content items in the storage location have in common. Online content management system 106 can train a classifier for each separate storage location based on the content items of the corresponding storage location. Additionally, online content management system 106 can train a classifier by comparing the content items within a storage location to content items in another storage location to identify one or more distinguishing characteristics of the content items. Thus, the classifiers allow online content management system 106 to distinguish between storage locations based on the similarities and differences of the respective content items.

In addition to training classifiers based on the characteristics of content items, online content management system 106 can also identify additional storage locations in connection with content items for a user account. Specifically, online content management system 106 is not limited to determining storage locations based only on the trained classifiers, but can use other criteria for determining storage locations. For instance, online content management system 106 can store information about the user's most frequently accessed, most recently accessed, or default (e.g., "home") storage locations.

In one or more embodiments, client device 104 optionally allows a user to create a content item 206. Specifically, a user can use client device 104 to create a content item using a client application running on client device 104. In some embodiments, the client application is specific to the online content management system 106. Additionally, the client application can be a native application that the user installs and runs on client device 104. Alternatively, the client application can be a web-based application that the user runs via a web browser. As mentioned, the content item can include text data, image data, audio data, and/or video data. As such, the content item can be a text document, an image, an audio file, a video file, or a combination of more than one type of file with mixed media content. Alternatively, the user can access a previously created content item to move the content item from a first storage location to a second storage location.

After creating the content item, or before creating the content item, client device 104 can establish a login session 208 with online content management system 106. Specifically, client device 104 can establish the login session with online content management system 106 by logging into a user account via a client application running on client device 104. For instance, the user can log in to the user account by entering login credentials such as a username and a password into the client application. Entering the login credentials can cause client device 104 to establish a connection with online content management system 106 to verify the credentials and initiate a login session. In one or more embodiments, the login session is a persistent login session. Alternatively, the login session can terminate when the user logs out or when the user closes the client application.

In one or more embodiments, after establishing the login session with online content management system 106, client device 104 sends the content item 210 to online content management system 106. In particular, client device 104 sends the content item to online content management system 106 to store in connection with the user account. For example, client device 104 can upload the content item to a database of content items that allows the user to access the content items at any user devices associated with the user account. In one example, client device 104 uploads the content item to online content management system 106 based on a user preference for manually or automatically uploading content items. In one or more embodiments, the client application automatically communicates a request to store the content item to online content management system 106 based on a login session being established between client device 104 and online content management system 106.

After uploading or otherwise sending the content item to online content management system 106, online content management system 106 can then store the content item. In one or more embodiments, online content management system 106 optionally stores the content item in a default location 212. For example, the default location can be a temporary storage location in which all content items are initially stored on online content management system 106. To illustrate, online content management system 106 can store content items that the user uploads in connection with the user account in a root node or in a specifically designated default storage location.

In one or more embodiments, online content management system 106 stores any content items in the default location. For example, online content management system 106 can store all content items that the user uploads in the default location regardless of file type or content. Alternatively, online content management system 106 can store the content items into a plurality of default locations based on the content type or file extension of the content items. To illustrate, online content management system 106 can store image files in a first default location, text files in a second default location, etc. In one or more alternative embodiments, the online content management system 106 initially stores the content item in a storage location of the user's choosing instead of storing the content item in the default location, as described below.

In one or more embodiments, after the user has uploaded one or more content items to online content management system 106, or in response to a request to upload a content item, client device 104 establishes a login session 214 with online content management system 106. For example, if the client device 104 has previously established a login session with online content management system 106, client device 104 may log out of the previous session after closing an application. Additionally, client device 104 may automatically log out after the passage of a predetermined amount of time. To illustrate, a login session may be associated with a cookie that expires after a certain amount of time without logging in.

In response to establishing the login session between client device 104 and online content management system 106, client device 104 can identify a request to store a content item 216. For example, client device 104 can identify a content item that the user previously created for storing on online content management system 106. To illustrate, when client device 104 connects to online content management system 106 based on the login session, the user can navigate and/or interact with content items that the user has previously stored on online content management system 106. Additionally, the user can upload one or more new content items for the current login session.

In one or more embodiments, the user selects one or more content items to store on online content management system 106 or to move from a first storage location to a second storage location. For example, the user can view content items stored in a temporary storage location on online content management system 106 and select one or more items to move. Alternatively, the user can view content items in a file structure or hierarchy that the user previously stored on online content management system 106.

After the user selects an item and requests to move the content item (either via an explicit request or an implicit request in response to uploading the content item), system 100 can determine characteristics of the content item 218. In one or more embodiments, client device 104 determines one or more characteristics of the content item by analyzing the content item. For example, client device 104 can determine a data type of the content item, including whether data in the content item is text data, image data, audio data, and/or video data. Although FIG. 2A illustrates client device 104 determining the characteristics of the content item, online content management system 106 can alternatively determine characteristics of the content item.

According to one or more embodiments, analyzing the content item includes using word processing, optical character recognition analysis, image processing, and/or audio processing techniques to identify characteristics of the content item. For example, in response to detecting that the user has captured an image or created any type of content item, client device 104 can analyze the content item using one or more of the above techniques. Alternatively, client device 104 can send the content item to online content management system 106 so that online content management system 106 can analyze the content item using one or more of the above techniques and prepare the content item for storage. In one or more embodiments, client device 104 can perform certain analyses on content items and online content management system 106 can perform other analyses on content items, depending on the capabilities of client device 104 and online content management system 106. In one or more embodiments, determined characteristics of a content item include an application used to create/capture the content item; location associated with the content item (e.g., a geographical location of creation of the content item or location of client device 104 when uploading the content item); an operating system of client device 104; objects/persons detected in the content item (e.g., faces, names, recognized places/objects, types of places/objects); a name of the content item; a type of device used to create/upload the content item; size of the content item; tags in metadata of the content item; a time or date associated with the content item; phrases or words used in the content item; and associations between the content item and recently stored content items or a plurality of other content items stored with the content item.

As illustrated in FIG. 2A, after determining the characteristics of the content item, client device 104 sends the characteristics of the content item 220 to online content management system 106. For example, client device 104 can compute a signature for the content item to send to online content management system 106. The digital signature can include a representation of the characteristics of the content item for online content management system 106 to use in comparing to signatures of previously stored content items to determine whether the content item is similar to any of the other content items. Alternatively, client device 104 can use other methods of sending the characteristics of the content item to online content management system 106, such as by sending the characteristics in a table format to online content management system 106.

Figure 2B:
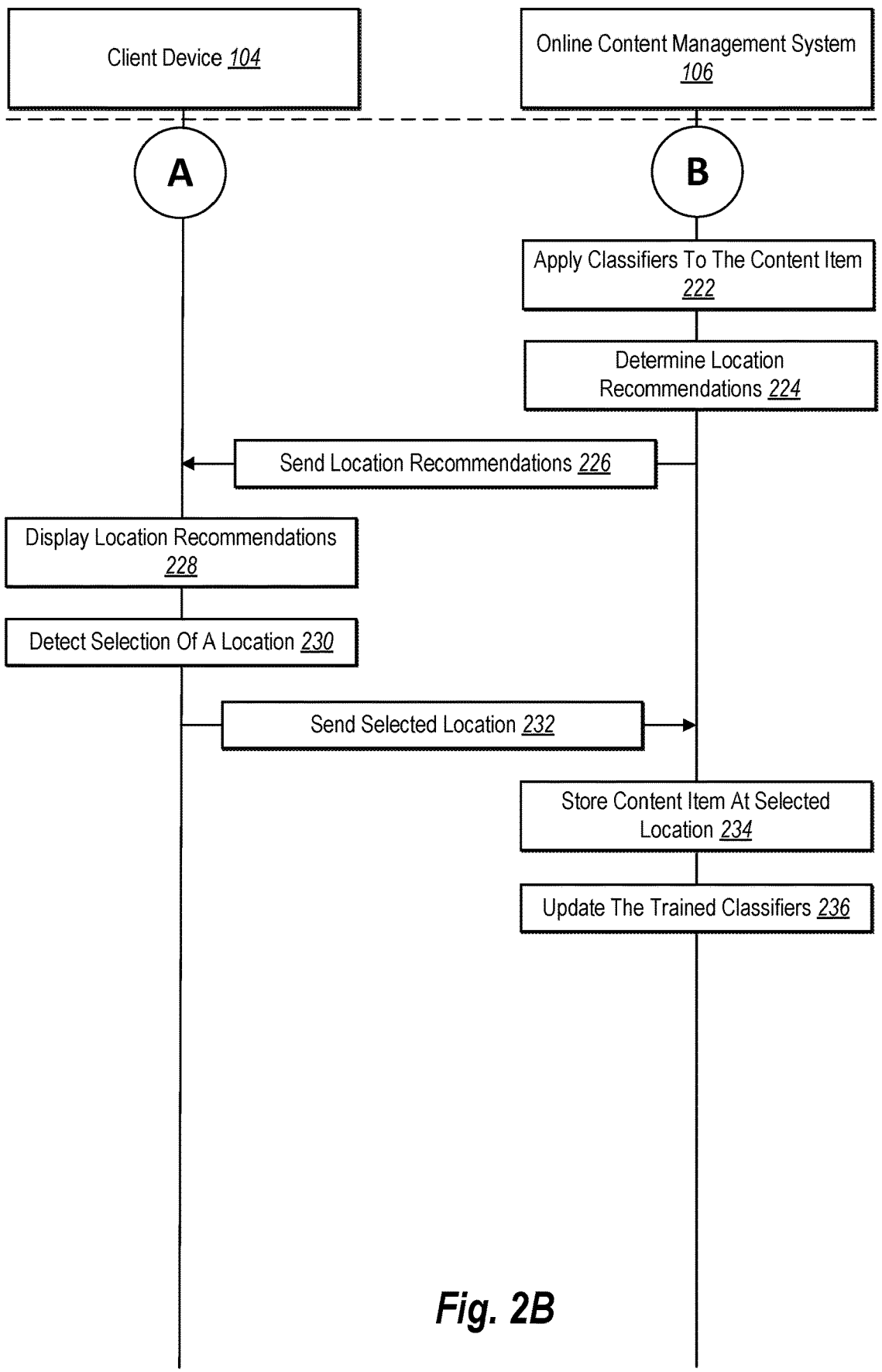

As illustrated in FIG. 2B, in response to receiving or otherwise identifying the characteristics of the content item, online content management system 106 uses the machine-learning model to provide storage location recommendations for storing the content item based on the characteristics. Specifically, online content management system 106 uses the trained classifiers for the plurality of storage locations to determine where a content item likely belongs. For example, online content management system 106 applies the classifiers to the content item 222. By applying the classifiers to the content item, online content management system 106 determines whether the content item is similar to content items in one or more of the storage locations and how similar the content item is to the content items in each storage location.

Using the classifiers, online content management system 106 thus determines storage location recommendations 224 for the user. For example, online content management system 106 can determine that the content item is more similar to the content items in a first storage location than the content items in a second storage location. Online content management system 106 can thus rank the possible storage locations and select one or more of the storage locations with the highest rankings. To illustrate, online content management system 106 can rank the storage locations and select a predetermined number of storage locations.

Alternatively, online content management system 106 can calculate a score for each storage location based on the trained classifiers and select storage locations with a score above a predetermined threshold. A score can be a value (e.g., numerical value) that allows online content management system 106 to compare a likelihood of storing the content item in a given storage location. To illustrate, if the content item has the same content type, is from same client application, has a similar date/timestamp, or includes similar content as the content items in the given storage location, the score for the given storage location can be higher than for another storage location that includes content items that do not share the same number of characteristics. Additionally, online content management system 106 can weight the characteristics differently based on priorities associated with the characteristics. Online content management system 106 can then compare the score of the given storage location to a predetermined threshold to determine whether to select the given storage location for providing as a recommended storage location.

After online content management system 106 determines the recommended storage locations, online content management system 106 sends the recommended storage locations 226 to client device 104. For example, online content management system 106 can send a plurality of recommended storage locations to client device 104. Alternatively, online content management system 106 can send a limited number of recommended storage locations to client device 104, depending on the settings or capabilities of client device 104, or based on a predetermined threshold number of recommended storage locations.

Client device 104 provides the recommended storage locations within a GUI of a display device of client device 104. For example, client device 104 can display storage location recommendations 228 within a user interface of a client application running on client device 104. For example, the client application can include settings or preferences that display a predetermined number of storage locations. To illustrate, the client application may have limited space for displaying recommended storage locations. Thus, the client application may select a predetermined number of the highest scored/ranked storage locations to display. Alternatively, the client application may display all of the identified storage locations for the content item (e.g., if there are not enough recommended storage locations to fill the GUI or within a scrollable list if there are too many).

In one or more embodiments, client device 104 displays the recommended storage locations as selectable elements. Specifically, client device 104 can display each storage location as a graphical element that a user may select within the client application to move the content item to a corresponding storage location. For example, as described in more detail below, client device 104 can display the storage locations as individually selectable icons, list elements, or menu elements. Client device 104 can then detect a selection of a storage location 230 associated with a graphical element and send the selected storage location 232 to online content management system 106. To illustrate, client device 104 can detect a user input (e.g., a touch input via a touchscreen of client device 104) to select a graphical element and verify the selection of the graphical element.

If client device 104 previously sent the content item to online content management system 106, online content management system 106 can then store the content item at the selected storage location 234. In particular, online content management system 106 can identify the selected storage location based on information from client device 104 and store the content item at the selected storage location in connection with the user account of the user. For example, if online content management system 106 previously stored the content item in another storage location (e.g., a temporary storage location, as described previously), online content management system 106 can move the content item from the other storage location to the selected storage location. If the online content management system 106 has not previously stored the content item, client device 104 can send the content item to online content management system 106, which can then store the content item at the selected storage location.

Online content management system 106 can then use the selected storage location of the content item to update the machine-learning model based on the content item and the selected storage location. In particular, online content management system 106 updates the trained classifiers 236 based on the newly stored/moved content item. For example, online content management system 106 can update a classifier associated with the selected storage location in accordance with one or more characteristics of the content item. Additionally, online content management system 106 can update one or more other classifiers associated with other storage locations to help the classifiers to further distinguish the contents of corresponding storage locations from the contents of the selected storage location.

By updating the classifiers after storing or moving a content item, online content management system 106 can continuously train the machine-learning model to learn storage patterns associated with new content and update the classifiers as storage patterns evolve. For example, online content management system 106 can train the machine-learning model to recognize storage patterns associated with new storage locations, new types of content, or with content items having previously identified characteristics. Additionally, users can change storage patterns over time, and the machine-learning model can learn to recognize changes in how the user stores content items while giving weight to more recent storage patterns when providing further storage location recommendations.

In one or more embodiments, online content management system 106 also trains the machine-learning model to recognize storage patterns in connection with a plurality of user accounts. Online content management system 106 can use the content item from client device 104 to update the machine-learning model (e.g., one or more classifiers) for use in providing storage location recommendations to other users (e.g., family, friends, coworkers, or other related group of users). As such, online content management system 106 can provide storage location recommendations to a plurality of users if the plurality of users as a whole have a specific storage convention for content items or if users want to store content items similarly to the way other users store content items for any reason. Additionally, online content management system 106 can provide different storage location recommendations to the other users if the storage patterns for one or more users change over time.

In one or more embodiments, online content management system 106 can apply different weights to users for training the machine-learning model. For example, online content management system 106 can apply a greater weight to a subset of users associated with the plurality of users. To illustrate, online content management system 106 can apply the machine-learning model to a plurality of user accounts associated with a company. The machine-learning model can weight storage conventions associated with managers or administrators of the company higher than other users so that storage locations of content items associated with the managers or administrators influence the storage location recommendations more than the storage locations of content items of other users. Alternatively, online content management system 106 may use only the storage conventions of the subset of users to train the machine-learning model for providing storage location recommendations to the entire group of users.

As described above, a process for providing machine-learned storage location recommendations for storing a content item. As one can appreciate, providing storage location recommendations can occur in a remote storage environment (e.g., as displayed in FIG. 1) or in a local storage environment (e.g., on a local network or on a single client device). Accordingly, the operations for creating content and training/using a machine-learning model to provide storage location recommendations can occur on different devices or on the same device. For example, client device 104 can create and store content locally and also train/use a machine-learning model to provide storage location recommendations to the user without communicating with a separate server device or system such as online content management system 106. As such, the sequence of operations and the number and type of devices/systems of the system can be different than those described in relation to FIG. 2.

As will be described in more detail below, the components of the system as described with regard to FIG. 1 can provide, alone and/or in combination with the other components, graphical user interfaces. In one or more embodiments, the components allow a user to store, move, and/or otherwise interact with content items. In particular, FIGS. 3A-3D and the description that follows illustrate various example embodiments of the user interfaces and features of a client application that allows a user to interact with a file structure and content items within the file structure. For example, the client application can allow the user to store content items using machine-learned storage location recommendations.

As illustrated, FIGS. 3A-3D include client device 300 as a touchscreen computing device. Client device 300 may be a handheld device with a touchscreen. As used herein, the term "handheld device" refers to a device sized and configured to be held/operated in a single hand of a user. In additional or alternative example, however, client device 300 can be any suitable computing device, such as, but not limited to, a table device, a handheld device, larger wireless devices, laptop or desktop computer, a personal-digital assistant device, and/or any other suitable computing device that can create or edit content and communicate with other devices using a data connection.

With reference to FIG. 3A, client device 300 includes client application 302 that allows a user to view content items in file interface 304. For example, client application 302 can allow the user to view one or more content items that are stored in a temporary storage location. As described previously, client application 302 can allow a user to upload a content item that the user created or captured to online content management system 106 to a temporary storage location (e.g., "Files" in FIG. 3A). FIG. 3A illustrates a temporary storage location including a plurality of content items. In one or more embodiments, client application 302 causes the user to store all content items that the user uploads to online content management system 106 first in the temporary storage location.

Although FIG. 3A illustrates a temporary storage location that allows a user to initially store content items on online content management system 106 in the temporary storage location, the user can store content items on online content management system 106 without first storing the content items in a temporary storage location. For example, client application 302 can allow the user to store the content items directly in one of a plurality of storage locations in a file structure associated with the user account. As described in more detail below, storing content items in storage locations can include selecting storage locations from a plurality of recommended storage locations based on the machine-learning model.

In one or more embodiments, when a user logs into client application 302, client application 302 can display the temporary storage location by default. For example, client application 302 can detect that client device 300 has established a login session with a content storage service (e.g., a cloud-based service provided by online content management system 106 of FIG. 1). In response to detecting that client device 300 has established the login session, client application 302 can automatically display file interface 304 including the temporary storage location. Alternatively, client application 302 can display another location in file interface 304 (e.g., a root node of a file structure for a user account) or another user interface. In yet other embodiments, client application 302 allows the user to select a "normal" mode in which the user can browse the file structure using a traditional collapsible hierarchy view.

As mentioned, file interface 304 includes a plurality of content items that a user previously uploaded to online content management system 106. The previously uploaded content items can include a plurality of different types of content items. For example, the content items can include images, text files, media files, etc., in accordance with content files that the user has previously uploaded to online content management system 106. Additionally, the uploaded content items can be associated with one or more other client applications based on whether the user created or captured the content items with one or more other client applications. For instance, after the user creates/captures a plurality of content items using a plurality of different client applications, client application 302 can detect the new content items and automatically upload the content items to online content management system 106 for storing in the temporary storage location. If client application 302 does not have an active login session with online content management system 106, client application 302 can automatically upload content items that the user has created/captured the next time client application 302 establishes an active login session.

In one or more embodiments, client application 302 allows a user to interact with content items in a variety of ways. For example, the user can delete, copy, rename, share, or move one or more of the content items in the temporary storage location by selecting an option from plurality of options 306 in file interface 304. Additionally, client application 302 allows the user to opt not to move any of the content items from the temporary storage location. Thus, the user may opt to use the temporary storage location as a more permanent storage location.

In one or more embodiments, file interface 304 is a default user interface that client application 302 displays when a user first logs into online content management system 106 using client application 302. In particular, in response to establishing a successful login session, client application 302 can display file interface 304. Thus, running client application 302 and opening file interface 304 can cause client device 300 to display a plurality of content items in the temporary storage location. Additionally, file interface 304 can display one or more options that allow the user to interact with the content items, including options to delete, share, or move one or more content items in the temporary storage location.

In one or more embodiments, client application 302 allows a user to select a content item and then select move option 308 to move the content item from the temporary storage location to a new storage location. For example, the user may want to move a content item from to a new storage location for organizing content items in the file structure. To illustrate, if the user creates a new content item associated with a particular client, the user may select the content item in the temporary storage location and then select move option 308 to move the content item to a storage location associated with the particular client. Other embodiments can allow the user to modify the file structure, such as by creating new folders, deleting existing folders and/or content items, and moving folders from one node to another within the file structure.

After a user has selected a content item and then selected move option 308 to move the content item, client application 302 allows the user to select a storage location for moving the content item. Specifically, FIG. 3B illustrates an embodiment of file interface 304 including first view 310 of the temporary storage location and second view 312 of a plurality of storage location recommendations. For example, when the user selects the content item, client application 302 displays the storage location recommendations for moving the content item from the temporary storage location to a new storage location from the list of recommended storage locations. Additional embodiments allow the user to view recommended storage locations without the user selecting a move option by displaying the recommended storage locations in response to the user selecting the content item.

As illustrated, first view 310 and second view 312 are displayed vertically (i.e., first view above second view) for viewing on a mobile device such as client device 104. For example, client application 302 can provide a split view on client device 300 to display content items in the temporary storage location and the storage location recommendations. In one or more embodiments, displaying first view 310 and second view 312 shrinks the viewable portion of the temporary storage location based on a display size of the display device of client device 300. Alternatively, first view 310 and second view 312 may be displayed in any configuration based on the user's preferences or the capabilities of client device 104. For example, client application 302 can display first view 310 and second view 312 in separate windows, tabs, or other display configurations.

In one or more embodiments, selecting a content item in first view 310 of the temporary storage location causes client device 302 to highlight the selected content item. In particular, when the user selects first content item 314, client application 302 highlights first content item 314 from the temporary store location within file interface 304, as illustrated in FIG. 3B. When highlighting first content item 314, client application 302 can display first content item 314 in a way that visually indicates that the user selected first content item 314. Thus, client application 302 can highlight first content item 314 by displaying a selection box, color, or other visual or audible indicator that the user selected first content item 314 from the content items in the temporary storage location.

Additionally, selecting a content item from the temporary storage location causes client application 302 to display a plurality of graphical elements representing the storage locations recommendations corresponding to the selected content item. For example, selecting first content item 314 causes client application 302 to display one or more of the storage location recommendations within second view 312 of content items of the temporary storage location. To illustrate, client device 300 identifies a request to provide storage location recommendations and passes the request to online content management system 106. Online content management system 106 then uses the request to generate one or more storage location recommendations based on a machine-learning model (e.g., using trained classifiers) for storing the content item.

In one or more embodiments, client application 302 displays graphical elements 316 representing storage location recommendations to allow the user to select a new storage location for first content item. For example, online content management system 106 displays graphical elements 316 in a list, with the most likely storage location at the top of the list. In at least some implementations, online content management system 106 displays graphical elements 316 based on scores associated with the corresponding storage location recommendations. Thus, online content management system 106 can display graphical elements 316 corresponding to storage location recommendations with the highest scores. Alternatively, online content management system 106 can display graphical elements 316 according to other design/aesthetic conventions to allow the user to easily view and select a storage location.

According to one or more embodiments, client application 302 can detect a selection of another content item within the temporary storage location. Specifically, FIG. 3C illustrates that the user selects second content item 318. When the user selects second content item 318, client application 302 displays graphical elements corresponding to storage location recommendations for second content item 318. For example, when the user selects second content item 318, client application 302 highlights second content item within first view 310 of file interface 304. Additionally, client application 302 displays graphical elements 320 that represent storage location recommendations for second content item 318 within second view 312 of file interface 304.

Because second content item 318 is different than first content item 314, the storage location recommendations for each content item can be different for each content item. In particular, the system (e.g., system 100 of FIG. 1) identifies storage location recommendations for first content item based on characteristics of first content item 314 and storage location recommendations for second content item 318 based on characteristics of second content item. For example, the system uses classifiers for the plurality of storage locations for a user account of the user of client device 300 to identify one or more storage locations in which the user is likely to store first content item 314. Likewise, the system uses the classifiers to identify one or more storage locations in which the user is likely to store second content item 318.

If first content item 314 and second content item 318 have one or more different characteristics, the system can provide one or more different storage location recommendations for second content item 318 than for first content item 314. For instance, if first content item 314 is a PDF document from a scanner, client application 302 can display a plurality of graphical elements for storage location recommendations associated with scans. The storage location recommendations can be existing storage locations or new storage locations based on the classifiers. If second content item 318 is an image document, client application 302 can display a plurality of graphical elements for storage location recommendations associated with images. The system can provide storage location recommendations if the content items share one or more similar characteristics based on the scores of the storage location recommendations.

In one or more embodiments, client application 302 also provides a thumbnail version of a selected content item to facilitate recognition of the content item. For example, if the user selects second content item 318 (or taps, presses, or hovers over second content item 318), client application 302 can display thumbnail 319 of second content item 318 to allow the user to more easily identify contents of second content item 318. The thumbnail version can be large enough for the user to view the contents of the selected content item. FIG. 3C illustrates that client application 302 displays thumbnail 319 to the right of a displayed name of second content item 318 or on the right side of file interface 304. Providing a thumbnail version can be especially useful if the temporary storage location includes a plurality of similarly named content items.

After a user selects a graphical element to store a content item in a corresponding storage location recommendation, client application 302 can highlight the selected graphical element and request that the user verify the action to move the content item. Specifically, client application 302 can display verification message 322 within file interface 304, as illustrated in FIG. 3D. Verification message 322 includes a request to cancel or accept the action to move the content item from the temporary storage location to the selected storage location. The user can accept the action to move the content item, the user can select accept element 324 in verification message 322. Alternatively, the user can cancel the action to move the content item, the user can select cancel element 326 in verification message 322.

If the user accepts the action to move the content item to a recommended storage location, client device 300 can then cause the system store the content item in the selected storage location. Additionally, moving the content item to the selected storage location results in the removal of the content item from the temporary storage location. If the user cancels the action to move the content item, client device 300 can close verification message 322 and return to file interface 304 as illustrated in FIG. 3C. Canceling the move action also results in the content item remaining in the temporary storage location.

In one or more embodiments, client application 302 also allows a user to move more than one content item at a time. Specifically, client application 302 can allow the user to move first content item 314 and second content item 318 to a storage location. If the user selects more than one content item, client application 302 can provide storage location recommendations that correspond to both content items. For example, the storage location recommendations can be related to a characteristic that the content items have in common. The user can then select a graphical element to move all of the selected content items to the corresponding storage location.

In addition to displaying a temporary storage location, client application 302 can allow a user to perform one or more operations associated with managing and/or organizing content in connection with a file structure for the user's account. For example, the user can create new nodes (e.g., folders) in the file hierarchy, move nodes from one location to another, delete nodes from the file hierarchy, or otherwise modify nodes in the hierarchy (e.g., by renaming folders). Thus, the user can modify the file hierarchy to suit the user's content management preferences and store content items in various storage locations according to the user's storage preferences.

FIGS. 3A-3D illustrate embodiments of a client application that a user can use in connection with the content storage system described herein. Although FIGS. 3A-3D illustrate a client application with particular interfaces and capabilities, the client application can include additional or alternative capabilities to allow the user to store and manage content in a local or remote storage environment. Additionally, the content storage system can allow a user to use a plurality of different client applications via a plugin that integrates with the client applications. Thus, the content storage system can provide storage location recommendations to a user in a variety of different circumstances to allow the user to efficiently manage content.

In one or more additional embodiments, the content storage system automatically manages the storage locations of content items. For example, the content storage system can determine a most likely storage location for a given content item and store the content item in the storage location. To illustrate, if the user creates, captures, or otherwise provides an image content item for storing in connection with a user account, the content storage system can store the image content item in the most likely storage location without additional user input. For instance, the content storage system can store the content item automatically if a confidence level or score associated with the storage location meets a threshold. Otherwise, the content storage system can store the content item in a temporary storage location as described herein.

Additionally, the content storage system can provide a notification indicating that the content storage system stored the content item in the storage location. For example, the content storage system can provide the notification the next time the user logs into the client application. The notification can include a message when the user opens the client application indicating one or more content items that the content storage system has automatically stored for the user account. The message can also allow the user to undo the automatic storage of one or more of the content items and/or allow the user to select new storage locations. Alternatively, the content storage system can provide the notification to an operating system of the user's client device.

Additionally, as previously described, the content storage system trains classifiers for providing storage location recommendations to a user when the user stores a content item. Described below is a specific implementation for training classifiers in the system. Specifically, the system trains multi-class classifiers which classify content items into a variety of different topics. First, the system obtains a histogram of folder names across a plurality of users. This can include filtering out folders generated by common programs or other common folders (e.g., "New Folder") using a blacklist or other filtering method. Alternatively, the system can leave the folders generated by common programs and trust the classifiers to learn to deal with such folders.

In one or more embodiments, the system takes the top k folder names from the histogram and clusters them into "synsets," which are synonym sets. Each synset is a group of terms that all map to the same meaning. The system can accomplish this using some combination of natural language processing and machine-learning techniques. For example, the system can convert each term into some feature representation and cluster the features to get the synsets.

The system can then perform an analysis on the content items in the folders. Specifically, for all users who have folders that match one of the synsets, the system computes text features and then folder coherence using distances between files within each folder. In one or more embodiments, this step is parallelizable by user and is not dependent on any of the previous steps. To get a pool of training data for each synset, the system can use all folders from all users that match the synset name and have a threshold level of coherence. In alternative embodiments, the system uses all of the folders from all users regardless of coherence and train the classifiers on all of the data.

The system can train the classifiers to output a probability or score per synset. For example, the system can train using a variety of different training models. To illustrate, the training models can include, but are not limited to, nearest neighbors, naïve Bayes, random forests, or deep nets. For each file, the system computes the synsets to which the file belongs by running the file through the classification model described above. For each folder, compute the "coherence" using the classifications of each file as an input. Additionally, the system tags each folder with the top class(es) of its files. One example of pseudo code for generating a score for a storage location suggestion is as follows:

```
destinations = Counter( )
top_synsets = classify(file)
for synset in top_synsets:
    for folder, score in folders_by_synset[synset]:
        destinations[folder] += score
return destinations.most_common( )
```

FIGS. 1-3D, the corresponding text, and the examples, provide a number of different systems and devices for providing machine-learned storage location recommendations when storing digital content items. In addition to the foregoing, embodiments can be described in terms of flowcharts comprising acts and steps in a method for accomplishing a particular result. For example, FIGS. 4 and 5 illustrate flowcharts exemplary methods in accordance with one or more embodiments.

Figure 4:
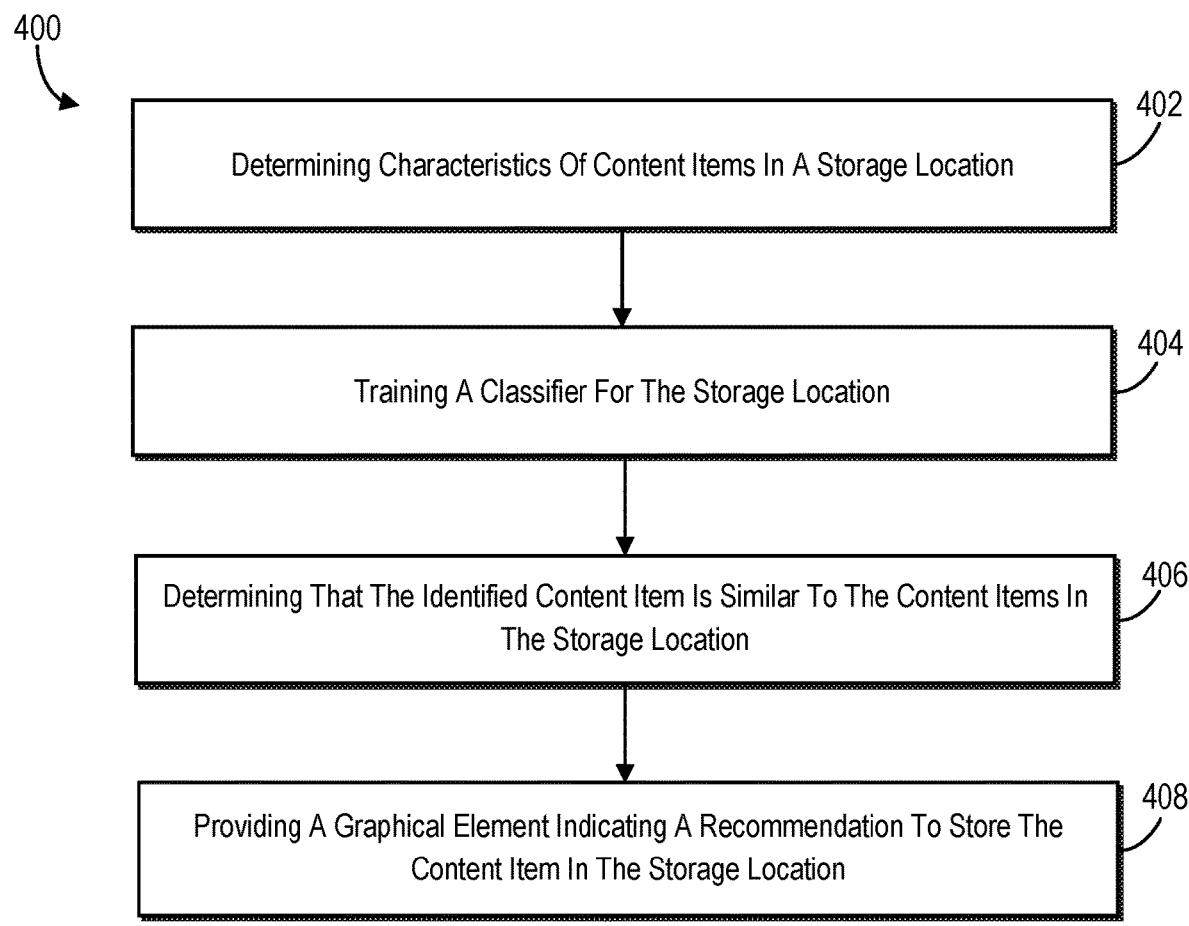
FIG. 4 illustrates a flowchart of a series of acts in a method of providing storage location suggestions for a content item in accordance with one or more embodiments.
Figure 5:
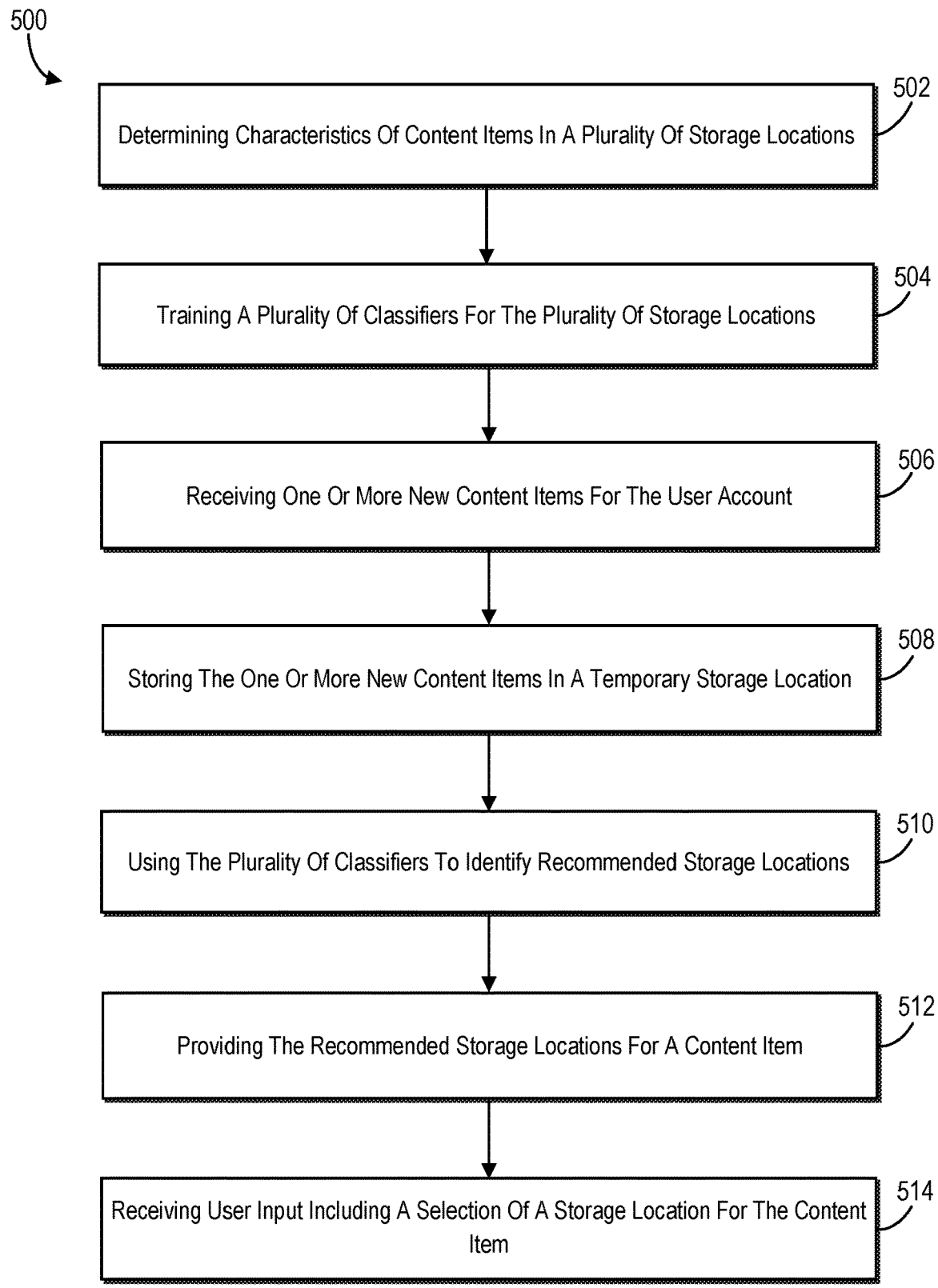
FIG. 5 illustrates a flowchart of a series of acts in another method of providing storage location suggestions for a content item in accordance with one or more embodiments.

FIG. 4 illustrates a flowchart of method 400 of providing storage location recommendations for a content item. Method 400 includes act 402 of determining characteristics of content items in a storage location. For example, act 402 involves determining characteristics of a plurality of content items stored in a storage location, the storage location associated with a user account. Act 402 can involve determining one or more characteristics that the plurality of content items have in common. Additionally, act 402 can involve determining one or more characteristics of the storage location. For instance, determining one or more characteristics of the storage location can involve determining a name characteristic of the storage location.

Method 400 also includes act 404 of training a classifier for the storage location. For example, act 404 involves training, based on characteristics of a plurality of content items in a storage location associated with a user account, a classifier for the storage location. Act 404 can involve applying a weight to each characteristic from the determined characteristics of the plurality of content items stored in the storage location.

Additionally, act 404 can involve training, for a plurality of storage locations, a plurality of classifiers based on characteristics of a plurality of content items in the plurality of storage locations. Act 404 can also involve determining one or more characteristics of the plurality of content items stored in the storage location that distinguish the storage location from one or more other storage locations. Act 404 can further involve training the plurality of classifiers to filter and ignore one or more storage locations generated by one or more client applications.

Method 400 can also include training a machine-learning model using a plurality of classifiers associated with a plurality of user accounts. For example, method 400 can include training the machine-learning model based on a plurality of related user accounts. Training the machine-learning model using a plurality of classifiers associated with a plurality of user accounts can involve determining characteristics of a plurality of content items in a plurality of storage locations associated with the plurality of user accounts, and training the plurality of classifiers based on the determined characteristics of the plurality of content items in connection with the plurality of user accounts.

Method 400 includes act 406 of determining that the identified content item is similar to the content items in the storage location. For example, act 406 involves determining, in response to a request to store an identified content item and using the classifier for the storage location, that the content item is similar to the plurality of content items stored in the storage location.

Method 400 further includes act 408 of providing a graphical element indicating a recommendation to store the content item in the storage location. For example, act 408 involves providing, for display within a user interface and based on determining that the identified content item is similar to the plurality of content items, a graphical element indicating a recommendation to store the content item in the storage location. Act 408 can involve scoring, using the plurality of classifiers, the plurality of storage locations for the identified content item; and providing, for display within the user interface, a recommendation to store the identified content item in a storage location with a highest score from the plurality of storage locations. Act 408 can also involve providing, for display within the user interface, the plurality of storage locations in an order based on rankings associated with the plurality of storage locations.

As part of act 408, or as an additional act, method 400 can include associating, using the plurality of classifiers for the plurality of storage locations, the identified content item with a storage location from the plurality of storage locations. Additionally, method 400 can include associating the identified content item with one or more storage locations from the plurality of storage locations according to scores associated with the one or more storage locations.

As part of act 408, or as an additional act, method 400 can include identifying a parent location of the storage location, and providing an additional recommendation to store the identified content item in a new storage location within the identified parent location of the storage location. For example, method 400 can include providing a recommendation to create a new storage location at a particular location in a file structure associated with the user account, and providing a recommendation to store the identified content item in the new storage location. Method 400 can also include providing a recommendation to name the new storage location with a machine-learned name suggestion.

FIG. 5 illustrates a flowchart of method 500 of providing storage location recommendations for a content item. Method 500 includes act 502 of determining characteristics of content items in a plurality of storage locations. For example, act 502 involves determining characteristics of a plurality of content items stored in a plurality of storage locations associated with a user account. Act 502 can involve determining characteristics based on text content, image content, audio/video content, or metadata content of the plurality of content items. Additionally, act 502 can involve identifying the plurality of storage locations in a hierarchy of storage locations associated with the user account.

Method 500 also includes act 504 of training a plurality of classifiers for the plurality of storage locations. For example, act 504 involves training, based on the determined characteristics of the plurality of content items for the plurality of storage locations, a plurality of classifiers for the plurality of storage locations. Act 504 can involve training a plurality of classifiers to predict a probability that a content item applies to each of one or more synonym sets, wherein a synonym set includes a plurality of terms that all map to a single meaning.

Method 500 further includes act 506 of receiving one or more new content items for the user account. For example, act 506 can involve receiving, from a client device associated with the user account, an upload of the one or more new content items. The one or more new content items can include an image file, a text file, an audio/video file. Act 506 can also involve receiving the one or more new content items in response to detecting that a login session has been established for the user account.

Method 500 also includes act 508 of storing the one or more new content items in a temporary storage location. For example, act 508 can involve automatically storing, without a user request, the one or more new content items in a default storage location associated with the user account. Additionally, act 508 can involve storing the one or more new content items in a plurality of temporary storage locations based on one or more characteristics of the one or more new content items. For example, act 508 can involve storing the one or more new content items in a plurality of temporary storage locations based on a file extension of each of the one or more new content items.

Method 500 includes act 510 of using the plurality of classifiers to identify recommended storage locations. For example, act 510 involves using the plurality of classifiers to identify one or more recommended storage locations for each of the one or more new content items. Act 510 can involve using the plurality of classifiers to determine that the user is likely to store the one or more new content items in one or more storage locations based on the one or more new content items being similar to content items in the one or more storage locations.

Additionally, method 500 includes act 512 of providing the recommended storage locations for a content item. For example, act 512 involve providing, within a user interface in response to establishing a user login session for the user account, the one or more recommended storage locations for a content item from the one or more new content items. Act 512 can also involve providing the one or more recommended storage locations according to a ranking associated with the one or more recommended storage locations. Additionally, act 512 can involve providing a subset of the one or more recommended storage locations, wherein the rankings of the one or more recommended storage locations in the subset meet a predetermined threshold.

Method 500 also includes act 514 of receiving user input including a selection of a storage location for the content item. For example, act 514 involves receiving, by way of the user interface, user input comprising a selection of a recommend storage location for the content item from the one or more new content items. Act 514 can also involve providing, within the user interface, a first view comprising the one or more new content items in a temporary storage location, and providing, within the user interface, a second view comprising the one or more recommended storage locations.

Method 500 can also include receiving, by way of the user interface, a first user input comprising a selection of a first new content item from the one or more new content items, and providing, within the user interface in response to the first user input, a plurality of recommended storage locations for the first new content item. Additionally, method 500 can include receiving, by way of the user interface, a second user input comprising a selection of a second new content item from the one or more new content items, and providing, within the user interface in response to the second user input, a plurality of recommended storage locations for the second new content item, wherein the plurality of recommended storage locations for the second new content item comprise at least one recommended storage location that is different than the plurality of recommended storage locations for the first new content item.

Method 500 can further include determining that a group of content items in the temporary storage location comprise a shared characteristic, providing, within the user interface based on the shared characteristic, a recommended storage location for the group of content items, receiving, by way of the user interface, user input comprising a selection of the recommended storage location for the group of content items, and moving, in response to the selection of the recommended storage location for the group of content items, the group of content items from the temporary storage location to the recommended storage location for the group of content items.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
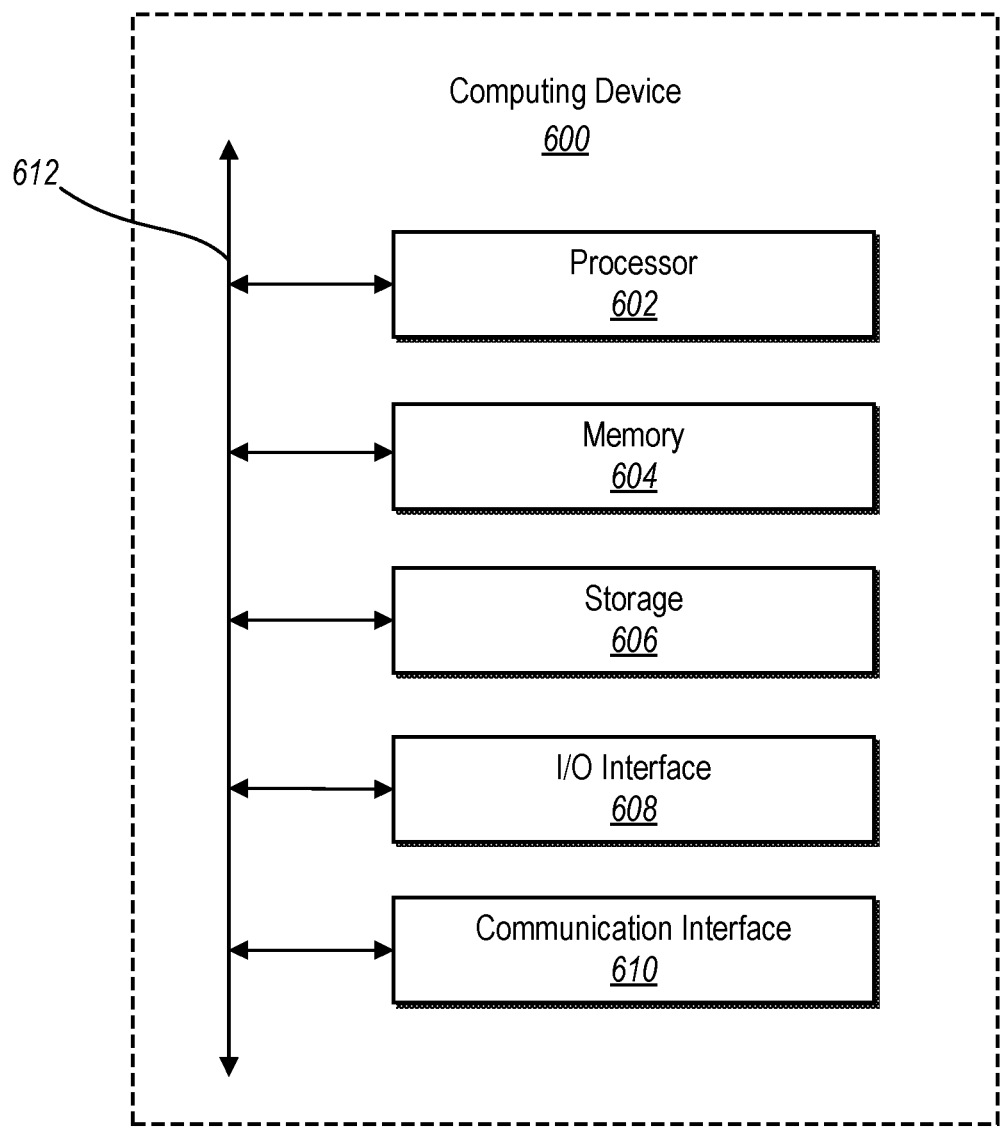
FIG. 6 illustrates a block diagram of a computing device in accordance with one or more embodiments.
Figure 7:
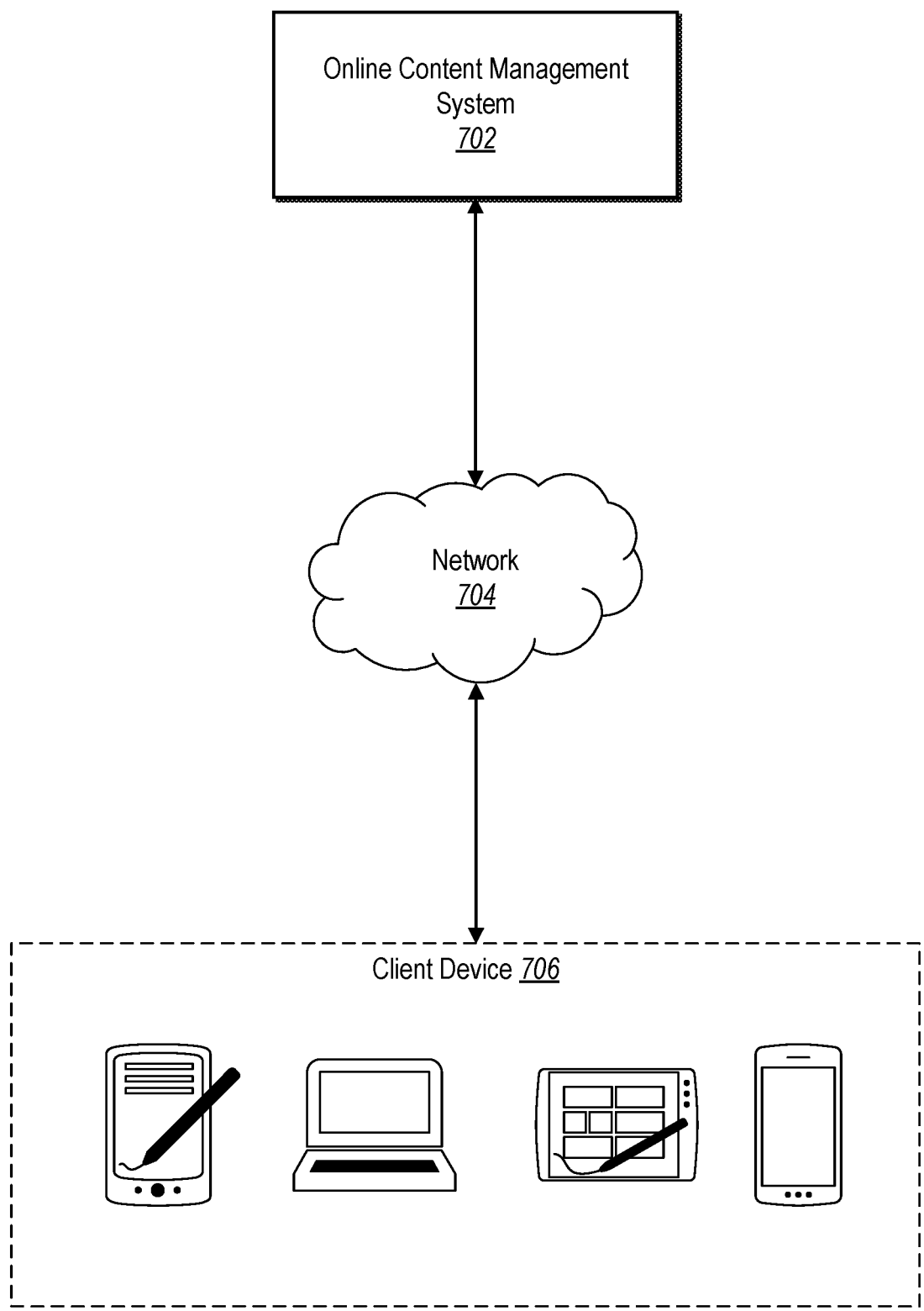
FIG. 7 illustrates a networking environment of an online content management system in accordance with one or more embodiments.

FIG. 6 illustrates a block diagram of exemplary computing device 600 that may be configured to perform one or more of the processes described above. One will appreciate that client device 104 and/or online content management system 106 may comprise one or more computing devices such as computing device 600. As shown by FIG. 6, computing device 600 can comprise processor 602, memory 604, storage device 606, I/O interface 608, and communication interface 610, which may be communicatively coupled by way of communication infrastructure 612. While an exemplary computing device 600 is shown in FIG. 6, the components illustrated in FIG. 6 are not intended to be limiting. Additional or alternative components may be used in other embodiments. Furthermore, in certain embodiments, computing device 600 can include fewer components than those shown in FIG. 6. Components of computing device 600 shown in FIG. 6 will now be described in additional detail.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage device 606 and decode and execute them. In particular embodiments, processor 602 may include one or more internal caches for data, instructions, or addresses. As an example and not by way of limitation, processor 602 may include one or more instruction caches, one or more data caches, and one or more translation lookaside buffers (TLBs). Instructions in the instruction caches may be copies of instructions in memory 604 or storage 606.

Memory 604 may be used for storing data, metadata, and programs for execution by the processor(s). Memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 604 may be internal or distributed memory.

Storage device 606 includes storage for storing data or instructions. As an example and not by way of limitation, storage device 606 can comprise a non-transitory storage medium described above. Storage device 606 may include a hard disk drive (HDD), a floppy disk drive, flash memory, an optical disc, a magneto-optical disc, magnetic tape, or a Universal Serial Bus (USB) drive or a combination of two or more of these. Storage device 606 may include removable or non-removable (or fixed) media, where appropriate. Storage device 606 may be internal or external to computing device 600. In particular embodiments, storage device 606 is non-volatile, solid-state memory. In other embodiments, Storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 608 allows a user to provide input to, receive output from, and otherwise transfer data to and receive data from computing device 600. I/O interface 608 may include a mouse, a keypad or a keyboard, a touch screen, a camera, an optical scanner, network interface, modem, other known I/O devices or a combination of such I/O interfaces. I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 608 is configured to provide graphical data to a display for presentation to a user. The graphical data may be representative of one or more graphical user interfaces and/or any other graphical content as may serve a particular implementation.

Communication interface 610 can include hardware, software, or both. In any event, communication interface 610 can provide one or more interfaces for communication (such as, for example, packet-based communication) between computing device 600 and one or more other computing devices or networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 612 may include hardware, software, or both that couples components of computing device 600 to each other. As an example and not by way of limitation, communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

FIG. 6 is a schematic diagram illustrating an environment within which one or more embodiments of system 100 can be implemented. Online content management system 602 may generate, store, manage, receive, and send digital content (such as digital videos). For example, online content management system 602 may send and receive digital content to and from client devices 606 by way of network 604. In particular, online content management system 602 can store and manage a collection of digital content. Online content management system 602 can manage the sharing of digital content between computing devices associated with a plurality of users. For instance, online content management system 602 can facilitate a user sharing a digital content with another user of online content management system 602.

In particular, online content management system 602 can manage synchronizing digital content across multiple client devices 606 associated with one or more users. For example, a user may edit digital content using client device 606. The online content management system 602 can cause client device 606 to send the edited digital content to online content management system 602. Online content management system 602 then synchronizes the edited digital content on one or more additional computing devices.

In addition to synchronizing digital content across multiple devices, one or more embodiments of online content management system 602 can provide an efficient storage option for users that have large collections of digital content. For example, online content management system 602 can store a collection of digital content on online content management system 602, while the client device 606 only stores reduced-sized versions of the digital content. A user can navigate and browse the reduced-sized versions (e.g., a thumbnail of a digital image) of the digital content on client device 606. In particular, one way in which a user can experience digital content is to browse the reduced-sized versions of the digital content on client device 606.

Another way in which a user can experience digital content is to select a reduced-size version of digital content to request the full- or high-resolution version of digital content from online content management system 602. In particular, upon a user selecting a reduced-sized version of digital content, client device 606 sends a request to online content management system 602 requesting the digital content associated with the reduced-sized version of the digital content. Online content management system 602 can respond to the request by sending the digital content to client device 606. Client device 602, upon receiving the digital content, can then present the digital content to the user. In this way, a user can have access to large collections of digital content while minimizing the amount of resources used on client device 606.

Client device 606 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 606 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 604.

Network 604 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 606 may access online content management system 602.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
   determining, by at least one processor, characteristics of a plurality of content items stored in a plurality of storage locations associated with a user account;
   determining, by the at least one processor and using a machine-learning model trained to classify new content items based on the characteristics associated with the plurality of content items stored in the plurality of storage locations, storage location scores for a group of content items;
   determining, by the at least one processor and based on the storage location scores, a storage location of the plurality of storage locations;
   providing a recommendation to store the group of content items in a new storage location within a parent location of the determined storage location; and
   moving, in response to a user input selecting the new storage location, the group of content items together as a group to the new storage location within the parent location.

2. The method as recited in claim 1, wherein the machine-learning model comprises a plurality of classifiers for the plurality of storage locations associated with the user account.

3. The method as recited in claim 2, wherein determining the storage location scores for the group of content items comprises determining that the group of content items comprise a shared characteristic by determining the shared characteristic using a first classifier of the machine-learning model based on a first characteristic that a first plurality of content items in a first storage location have in common and a second classifier of the machine-learning model based on a second characteristic that a second plurality of content items in a second storage location have in common.

4. The method as recited in claim 3, wherein:
   determining the storage location scores for the group of content items comprises determining, using the machine-learning model, that each content item in the group of content items corresponds to the first classifier associated with the first characteristic; and
   determining the storage location of the plurality of storage locations comprises determining the first storage location as a recommended storage location.

5. The method as recited in claim 2, wherein the plurality of classifiers for the plurality of storage locations associated with the user account are weighted based on priorities associated with the characteristics.

6. The method as recited in claim 2, further comprising:
   determining the storage location scores for the group of content items by scoring, using the plurality of classifiers, the plurality of storage locations for the group of content items; and
   providing, for display within a user interface, a graphical element indicating the recommendation to store the group of content items in the new storage location by determining that a storage location score associated with the parent location comprises a highest score from the plurality of storage locations.

7. The method as recited in claim 6, further comprising providing, for display within the user interface, a subset of storage locations from the plurality of storage locations in an order based on the storage location scores.

8. The method as recited in claim 7, further comprising determining that each storage location in the subset of storage locations meets a predetermined score threshold.

9. The method as recited in claim 1, further wherein providing the recommendation to store the group of content items in the new storage location comprises providing a recommendation to create the new storage location at a particular location in a file structure associated with the user account.

10. The method as recited in claim 1, further comprising:
storing the group of content items in a temporary storage location with a plurality of additional content items in response to the group of content items being stored in a default storage location during a first login session; and
providing the recommendation to store the group of content items in the new storage location in response to establishing a second login session.

11. A system comprising:
at least one processor; and
a non-transitory computer readable storage medium comprising instructions that, when executed by the at least one processor, cause the system to:
determine characteristics of a plurality of content items stored in a plurality of storage locations associated with a user account;
determine, using a machine-learning model trained to classify new content items based on the characteristics associated with the plurality of content items stored in the plurality of storage locations, storage location scores for a group of content items;
determine, based on the storage location scores, a storage location of the plurality of storage locations;
provide a recommendation to store the group of content items in a new storage location within a parent location of the determined storage location; and
move, in response to a user input selecting the new storage location, the group of content items together as a group to the new storage location within the parent location.

12. The system as recited in claim 11, wherein the machine-learning model comprises a plurality of classifiers for the plurality of storage locations associated with the user account.

13. The system as recited in claim 12, further comprising instructions that, when executed by the at least one processor, cause the system to:
determine the storage location scores for the group of content items by determining, using the machine-learning model, that each content item in the group of content items corresponds to a classifier associated with a shared characteristic of the group of content items from the plurality of classifiers; and
determine the storage location of the plurality of storage locations by determining that the storage location corresponds to the classifier associated with the shared characteristic.

14. The system as recited in claim 11, further comprising instructions that, when executed by the at least one processor, cause the system to:
determine the storage location scores for the group of content items by scoring, using the machine-learning model, the plurality of storage locations for the group of content items; and
provide, for display within a user interface, a graphical element indicating the recommendation to store the group of content items in the new storage location by determining that a storage location score associated with the determined storage location comprises a highest score from the plurality of storage locations.

15. The system as recited in claim 14, further comprising instructions that, when executed by the at least one processor, cause the system to provide, for display within the user interface, a subset of storage locations from the plurality of storage locations in an order based on the storage location scores, wherein each storage location in the subset of storage locations meets a predetermined score threshold.

16. The system as recited in claim 11, further comprising instructions that, when executed by the at least one processor, cause the system to create the new storage location at a particular location in a file structure associated with the user account.

17. The system as recited in claim 11, further comprising instructions that, when executed by the at least one processor, cause the system to:
store the group of content items in a temporary storage location with a plurality of additional content items during a first login session for the user account; and
provide a recommendation to store the group of content items in the new storage location in response to establishing a second login session for the user account.

18. A non-transitory computer readable storage medium comprising instructions that, when executed by at least one processor, cause a computer system to:
determine characteristics of a plurality of content items stored in a plurality of storage locations associated with a user account;
determine, using a machine-learning model trained to classify new content items based on the characteristics of the plurality of content items stored in the plurality of storage locations, storage location scores for a group of content items;
determine, based on the storage location scores, a storage location of the plurality of storage locations;
provide a recommendation to store the group of content items in a new storage location within a parent location of the determined storage location; and
move, in response to a user input selecting the new storage location, the group of content items together as a group to the new storage location within the parent location.

19. The non-transitory computer readable storage medium as recited in claim 18, further comprising instructions that, when executed by at least one processor, cause the computer system to:
determine the storage location scores for the group of content items by determining, using the machine-learning model, that each content item in the group of content items corresponds to a trained classifier associated with a shared characteristic of the group of content items; and
determine the storage location of the plurality of storage locations by determining that the storage location corresponds to the trained classifier associated with the shared characteristic.

20. The non-transitory computer readable storage medium as recited in claim 18, further comprising instructions that, when executed by at least one processor, cause the computer system to:
- determine the storage location scores for the group of content items by scoring, using the machine-learning model, the plurality of storage locations for the group of content items; and
- provide, for display within a user interface, a graphical element indicating the recommendation to store the group of content items in the new storage location by determining that the storage location associated with the parent location comprises a highest score from the plurality of storage locations.

* * * * *